United States Patent [19]

Cockshott et al.

[11] 4,441,371
[45] Apr. 10, 1984

[54] GAS FLOW METERS

[75] Inventors: Charles P. Cockshott, Balsall Common; Kenneth S. Evans, Blackpool, both of England

[73] Assignee: Lucas Industries Limited, Birmingham, England

[21] Appl. No.: 358,109

[22] Filed: Mar. 15, 1982

[30] Foreign Application Priority Data

Apr. 4, 1981 [GB] United Kingdom ............... 8110611

[51] Int. Cl.$^3$ .............................................. G01F 1/64
[52] U.S. Cl. ................................................ 73/861.09
[58] Field of Search ..................... 73/861.09; 324/455, 324/464

[56] References Cited

U.S. PATENT DOCUMENTS 4,167,114 9/1979 Zizine ............................... 73/861.09
4,345,478 8/1982 Barat ............................... 73/861.09

FOREIGN PATENT DOCUMENTS 2043380 10/1980 United Kingdom ............. 73/861.09

Primary Examiner—Gerald Goldberg
Assistant Examiner—Brian R. Tumm

[57] ABSTRACT

A corona-discharge type gas flow meter includes a discharge electrode, and a split collecting electrode, the collecting electrodes are connected to input amplifiers which act as current-to-voltage converters receiving a reference signal from an integrator acting to integrate the sum of the outputs of the input amplifiers. The output of the integrator is used to control an EHT supply for the discharge. An output amplifier provides a flow signal by running the signal from one input amplifier, from a variable offset nulling signal derived via an amplifier from the integrator and a fixed offset nulling signal from a potentiometer.

4 Claims, 1 Drawing Figure

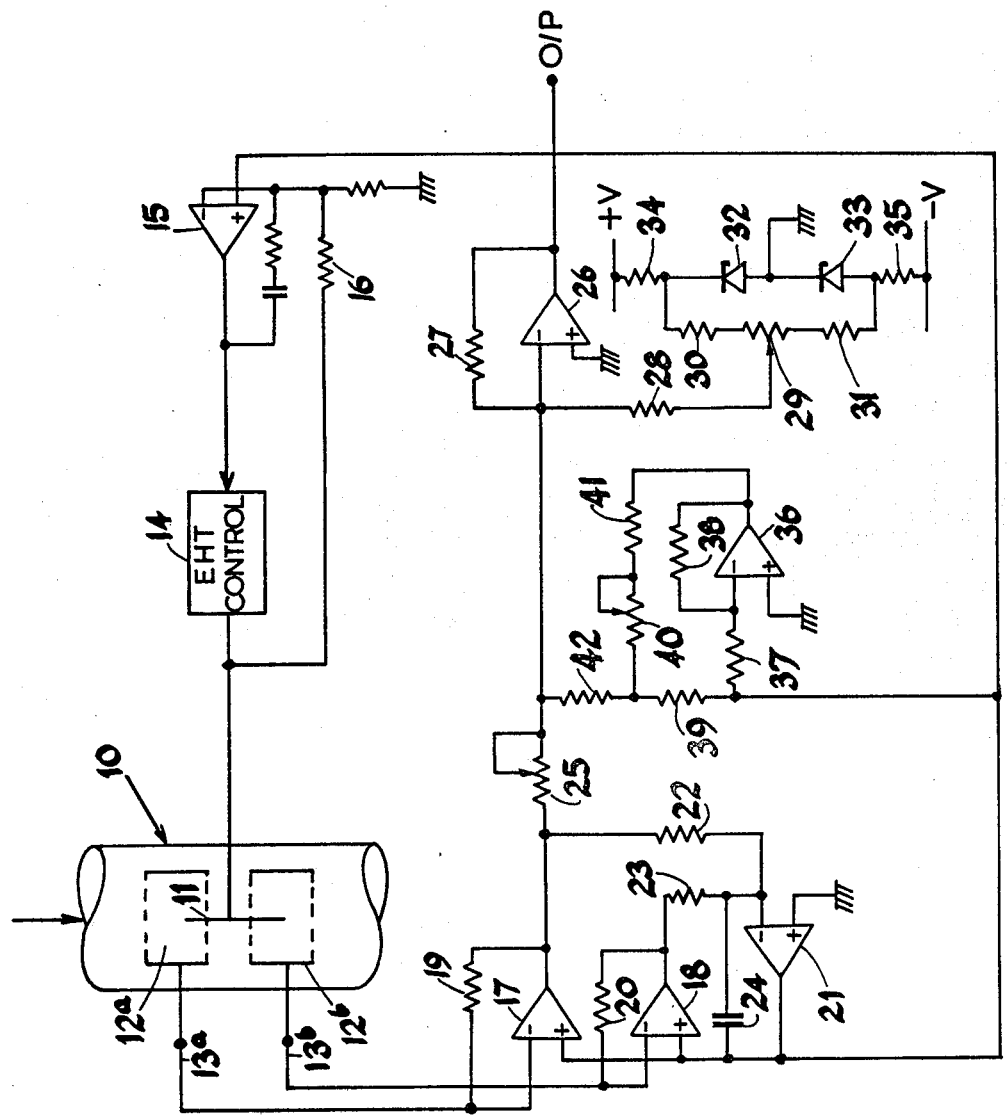

GAS FLOW METERS

This invention relates to gas flow meters and, more particularly gas flow meters of the corona-discharge type.

In a corona-discharge type gas flow meter a corona discharge is established between a discharge electrode and a split collecting electrode. The total impedance of the discharge is maintained substantially constant by means of a variable EHT supply control with a feedback circuit. In these circumstances the difference between the currents flowing from the discharge electrode to two terminals of the collector electrode is representative of the mass flow of gas through the space between the electrodes.

Problems can arise, however, because of inaccuracies in the mechanical construction of the meter, i.e. in the exact placing of the discharge electrode in relation to the collecting electrode. Such inaccuracies cause offset outputs which vary in accordance with the total discharge current and which therefore vary in accordance with atmospheric conditions.

It is an object of the invention to provide a corona-discharge gas flow meter with a current difference circuit which overcomes the problem referred to above.

A corona-discharge gas flow meter in accordance with the invention includes a current difference circuit comprising amplifier means having inputs connected to the collecting electrodes and producing at a first output point a first output signal dependent on the current difference and also a second output signal at a second output point dependent on the sum of the currents derived from the terminals of the collecting electrodes, an output amplifier connected to said amplifier means to receive said first output signal, adjustable means for applying to said output amplifier a fixed offset nulling signal, and means sensitive to said second output signal for applying to said output amplifier a variable offset nulling signal.

An example of the invention is shown in the accompanying drawing which is a circuit diagram of a meter with a current difference circuit.

The meter shown includes a duct 10 through which the gas flows. Mounted inside the duct is a discharge electrode 11 and a split collecting electrode 12a, 12b with terminals 13a, 13b. The voltage on the discharge electrode is controlled by an EHT supply 14 which operates to maintain the discharge impedance substantially constant. The supply 14 is controlled by a comparator 15 which receives an input representing the actual total discharge current flowing and a feedback input via a resistor 16 connected to the output of the supply 14.

The terminals 13a, 13b are connected to the inverting inputs of two operational amplifiers 17, 18. Each such amplifier has a feedback resistor 19,20 so that it acts as a current-to-voltage converter. The non-inverting inputs of amplifiers 17 and 18 are connected to the output of another operational amplifier 21 which has its non-inverting input grounded and its inverting input connected by two equal value resistors 22, 23 to the outputs of amplifiers 17 and 18. A capacitor 24 connects the output of amplifier 21 to its inverting input so that amplifier 21 acts as an integrator, integrating the sum of the outputs of amplifiers 17, 18. As a result, when the circuit is in equilibrium, the reference signal applied to the non-inverting inputs of the amplifiers 17, 18 will be such that the outputs of these amplifiers will be of equal amplitude, but of opposite polarity, i.e. their sum will be zero. Should any change of operating conditions cause the sum to be other than zero, the error will be integrated out, changing the reference voltage until the sum is zero.

The output of one of the amplifiers 17, 18 is connected by a variable resistor 25 to the inverting input of an output amplifier 26 which has its non-inverting input grounded and its output connected by a feedback resistor 27 to its inverting input. The output amplifier 26 thus acts an an inverting amplifier with its gain adjustable by means of resistor 25.

For correcting any offset inherent in the amplifiers there is provided a resistor 28 connecting the inverting input of amplifier 26 to the slider of a potentiometer 29. This potentiometer has its ends connected by resistors 30 and 31 respectively to the cathode of a zener diode 32 and the anode of a zener diode 33. These zener diodes are connected in series with two resistors 34, 35 between a positive supply rail and a negative supply rail, the interconnection of the zener diodes being grounded. Adjustment of the potentiometer 29 is effected to ensure that the output of amplifier 26 is zero when the EHT supply is switched off.

Another offset nulling control is incorporated to null offsets caused by inaccuracy in positioning the discharge electrode 11 relative to the collecting electrode 12a, 12b. This circuit includes another operational amplifier 36 connected as a unity gain inverting amplifier. A resistor 37 connects the output of amplifier 21 to the inverting input of amplifier 36. A feedback resistor 38 of the same value as resistor 37 is connected between the output and inverting input of amplifier 36. A resistor 39 is connected at one end to the output of amplifier 21 and at the other end, via a variable resistor 40 and a resistor 41 in series, to the output of amplifier 36. The junction of resistor 39 and the variable resistor 40 is connected by a resistor 42. Since the voltage at the output of amplifier 36 is of the same magnitude as that at the output of amplifier 21, but of opposite polarity, the voltage at the junction of resistor 39 and variable resistor 40 is proportional to the voltage at the output of amplifier 21. Adjustment of resistor 40 enables the proportionality constant to be varied in sign and magnitude so that the output of amplifier 26 can be set to zero when the EHT supply is on, but no gas is flowing through the duct 10.

The non-inverting input of the EHT control comparator 15 is also connected to the output of amplifier 21.

We claim:

1. A corona-discharge type gas flow meter having a discharge electrode, a split collecting electrode, means for maintaining a substantially constant impedance discharge between the discharge electrode and the collecting electrodes and a current difference circuit comprising amplifier means having inputs connected to the collecting electrodes and producing at a first output point a first output signal dependent on the current difference and also a second output signal at a second output point dependent on the sum of the currents derived from the terminals of the collecting electrodes, an output amplifier connected to said amplifier means to receive said first output signal, adjustable means for applying to said output amplifier a fixed offset nulling signal, and means sensitive to said second output signal for applying to said output amplifier a variable offset nulling signal.

2. A meter as claimed in claim 1 in which said amplifier means comprises first and second operational amplifiers having their inverting inputs connected to respective ones of the collecting electrodes, first and second resistors connecting the outputs of the respective first and second operational amplifiers to their inverting inputs, a third operational amplifier, third and fourth resistors connecting the respective outputs of the first and second operational amplifiers to the inverting input of the third operational amplifier, a capacitor connecting the output of the third operational amplifier to the inverting input thereof, the output of the third operational amplifier being connected to the non-inverting inputs of the first and second operational amplifiers and said first and second output points being respectively the outputs of the first and third operational amplifiers.

3. A meter as claimed in claim 1 or claim 2 in which said means sensitive to said second output signal comprises an offset-adjustment operational amplifier having its inverting input connected by a resistor to said second output point, a feedback resistor connecting the output of said offset-adjustment operational amplifier to the inverting output thereof, a resistor chain connecting the output of the offset-adjustment operational amplifier to the second output point, a point on said resistor chain being connected by a resistor to the input of the output amplifier.

4. A meter as claimed in claim 1 or claim 2 in which said means for maintaining a substantially constant impedance discharge comprises a controlled EHT supply having a control input from a comparator which receives an input from said second output point of said amplifier means and a feedback signal from the output of the EHT supply.

* * * * *